INVENTOR
JEAN-PIERRE LOUIS RODOLPHE HARIVEL
BY
ATTORNEYS

United States Patent Office 3,530,001
Patented Sept. 22, 1970

3,530,001
STORAGE CELLS UTILIZING FLEXIBLE ELECTRODES COMPRISING A POROUS FLEXIBLE FIBROUS CARRIER
Jean-Pierre Louis Rodolphe Harivel, Paris, France, assignor to Societe des Accumulateurs Fixes et de Traction (Societe Anonyme), Romainville, France, a company of France
Continuation of application Ser. No. 598,298, Dec. 1, 1966. This application Nov. 19, 1969, Ser. No. 871,689
Claims priority, application France, Dec. 1, 1965, 40,520
Int. Cl. H01m 35/00, 35/06
U.S. Cl. 136—6          10 Claims

ABSTRACT OF THE DISCLOSURE

Storage cells utilizing foldable and flexible electrodes that can be assembled in containers of any selected design and also deformable. The electrodes comprise a porous fibrous flexible carrier of synthetic material and active materials therein. Some of the fibres, at least, are of plastic or other synthetic material that is normally non-conductive and insensible to thermal, chemical and electrochemical conditions in batteries or cells into which the electrodes are incorporated. The fibrous carrier prior to assembly in the cell being in compressed reduced state of thickness relative to its initial thickness.

This application is a continuation of application Ser. No. 598,298, filed Dec. 1, 1966, now abandoned.

There are no pending U.S. related applications filed by applicant on this subject matter.

BRIEF SUMMARY OF THE INVENTION

This invention relates to electrodes for storage cells or batteries, particularly electrodes which are foldable and flexible, though very light and highly porous and including large amounts of electrochemically active material, as well as to methods of manufacture of such electrodes and storage cells using such electrodes.

Such foldable and flexible electrodes can be assembled in containers having any given design which in themselves may be deformable, so that the inner volume of the container is filled to the utmost, regardless of its shape and it is even possible thus to obtain deformable cells.

Electrodes for storage cells are known which comprise a conductive carrier which is provided both to hold the electrochemically active materials, which differ from one cell type to another and, also, to distribute the current throughout this active material whose conductivity may be low.

According to the invention, the electrodes comprise as a carrier of the active material, a porous and flexible element comprised of entangled felted or woven fibres, some at least of which are made of a plastic or synthetic substance, that is electrically non-conductive, chosen for its insensibility to the thermal, chemical and electrochemical conditions which prevail in the storage cells in which the electrodes are to be used. The arrangement of the fibres may be that of a woven fabric with symmetrically disposed fibres or that of a felt wherein the fibres are tangled at random.

One advantage in using plastic or synthetic fibres lies in cost saving since the cost of a plastic fibrous carrier sheet is less than that of another type of carrier such as a nickel sintered carrier, for instance. Another advantage is that the said fibres are comparatively light in weight, so that the mass efficiency of the battery is substantially increased.

It is advantageous to use a felted carrier or woven fabric of polyamid fibres, such as nylon, but other types of fibres may also be used, as will appear hereafter.

The method for depositing the active material in such a porous fibrous carrier involves well-known techniques, including, for instance, a chemical or electrochemical precipitation in situ in the carrier of the active material from a salt of the selected active material, the carrier being previously impregnated by this salt. This impregnation-precipitation sequence may be repeated several times if necessary, to arrive at the required amount of active material to be incorporated into the flexible carrier.

In U.S. Pat. No. 1,377,194, it has already been suggested to manufacture storage batteries by placing the active material directly on an insulating and porous carrier, the said carrier also acting as a separator between two adjacent electrodes. However, in this disclosure, the active material was spread onto the separator as a paste and, in addition, the active material was different on each side of the separator since it had to correspond to a positive electrode and to a negative electrode. In order to prevent the crumbling and shedding of this active material, it was covered on both sides of the separator by a metal sheet pressed upon it and acting also as a current collector. The assembly was permanently and firmly compressed.

Obviously, in such an arrangement, the porosity of the carrier itself cannot be used for retaining the active materials since then both active materials, i.e., positive and negative would become intermingled. Moreover, such a compressed block would not practically exhibit any flexibility.

In the electrodes of the present invention, the active material deposited into or incorporated within a given porous flexible fibrous carrier is of one kind only, e.g., positive or negative and forms only one electrode, e.g., a positive or negative electrode and assembly of a storage cell requires use of separate positive and negative electrodes. In addition, the said active material in each electrode is firmly adherent to the fibres of its porous fibrous carrier, the original flexibility of which is not significantly lessened by the incorporation therein of the required active material. Therefore, such electrodes can be folded, unfolded, rolled up and unrolled at will, without any special care, either before or even after drying, since their flexibility is maintained at all times.

While it is possible, according to the invention, to apply a thin flexible metal sheet or gauze on each face of the flexible carrier as a current conductor and collector through the active material deposited on this carrier, this collector is only intended as current lead, but does not and cannot act as a retainer for the active material since the said active material is embedded in the pores or voids of the fibrous carrier, through and through.

With the same purpose of current conduction, it is also possible according to the invention either to metallize all or some of the insulating fibres of the carrier, before the deposition of active material, or to introduce conductive fibres into the tangle of plastic fibres constituting the carrier.

According to the invention, such electrodes can replace any other known type of electrodes, both in vented and in sealed storage cells. Preferably, although not essentially, such electrodes should be submitted to a permanent compression prior to assembly in a storage cell in order to improve the efficiency of the active materials thereof.

As a specific application of such electrodes, they can be used in deformable cells. For this purpose, they can be lodged in a container made of a soft plastic sheet material, such as polyethylene, stretched and sealed all around the electrodes, separator, electrolyte and current collectors and terminals.

The electrodes and container being flexible, the batteries or cells can be placed upon or around any object, so that they exactly fit its shape or contour. As an example, they might be rolled or clamped around pipes or cables, depending on their relative dimensions, a clamping strip being provided not only to fix the battery or cell in place, but also to press the electrodes thereof close together, thus improving the electrochemical efficiency.

DETAILED DESCRIPTION

Figure 1:
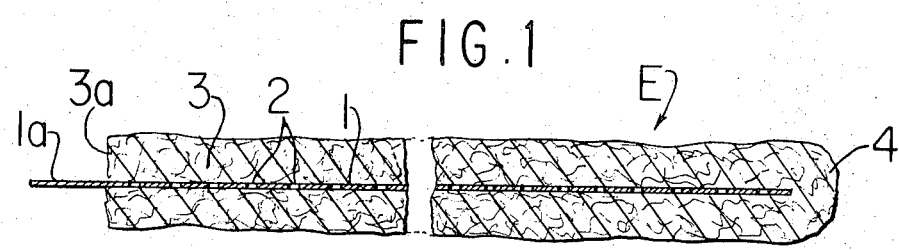
FIG. 1 illustrates in cross-section and on an exaggerated scale, an electrode embodying the invention prepared in accord with a first embodiment of method of its preparation.

Several embodiments of methods of manufacture, of electrodes and cells in accord with the invention will now be described, as non-limitative examples.

EXAMPLE I

The description regarding this example as presented below relates specifically, but not exclusively to the design of low discharge rate storage batteries or cells. Considering, for example, the case of a nickel-cadmium alkaline battery, each electrode is manufactured either from a carrier felt sheet or a carrier polyamid fabric sheet of the desired size or from a continuous strip of carrier felt or carrier polyamid fabric, which is subsequently cut to desired dimensions.

The said porous fibrous carrier of felt or woven fabric, whose fibres preferably are made wettable, in conventional manner, is dipped into a hot nitrate solution (nickel nitrate, possibly containing an addition of cobalt nitrate for the positive electrode, or cadmium nitrate for the negative electrode), dried, soaked in a hot alkaline solution (potassium or sodium hydroxide) to precipitate the corresponding electrochemically active hydroxide over, onto and in voids between the felted or woven fibres of the carrier material, then washed to remove any excess of alkaline solution, and finally dried. The operational sequence of steps "impregnation-drying-precipitation" on the carrier material can be repeated as many times as necessary to introduce the required amount of hydroxide on and into voids between the fibres of this carrier material corresponding to the desired capacity of the particular electrode.

Another mode of operation is to manufacture the said electrodes in a continuous process using a strip of felted or woven fabric carrier material which strip is submitted to the same operational sequence as just described above and subsequently to cut the electrodes from such treated strip to the desired size. The ratio of the active material weight to the initial carrier weight can reach values as high as 10 to 20. During my tests, this ratio has been selected as 10, but any other value could have been obviously chosen depending on the electrodic purpose without departing from the scope of the invention.

The current collectors for the electrodes of this invention may be constituted by thin metal sheets (e.g. perforated sheets of nickel-plated steel or of copper, for example) thin enough not to impair the flexibility of the whole electrode. These current collectors also may be replaced by equivalents such as thin metallic wire gauze, grids or screens or by expanded metal of similar material. Advantageously, the thickness of such collectors can be chosen to be below 0.1 millimeter, and preferably to be equal to about 0.05 millimeter.

Several manners of assembling such current collectors with the carriers bearing the active material applied thereto as described to complete the electrodes may be used with the view of obtaining a good conductive contact distributed all over the carrier surface of the electrodes or the active material incorporated in voids of the carrier.

An advantageous embodiment consists in folding a felted carrier sheet of nylon impregnated with the active material as described above around the current collector, which latter is constituted either by a perforated or a plain metal sheet. FIG. 1 of the accompanying drawing shows a cross-section of an electrode E prepared as described hereabove. The thin and flexible metal sheet 1 constituting the current collector is shown as provided with a plurality of small holes or perforations 2 and is covered on both its sides or faces with the plastic felted carrier sheet 3, bearing the active material incorporated therein as hereinabove described, said sheet being folded at 4 at a 180° angle so that the inner faces of the folded carrier engage opposite faces of the metal sheet 1 intimately and also makes good electrical contact with the active material that has been incorporated into the carrier. The end 1a of the metal sheet which projects outwardly of the free ends 3a of the folded carrier may serve as a connecting lug for the electrode E.

Figure 2:
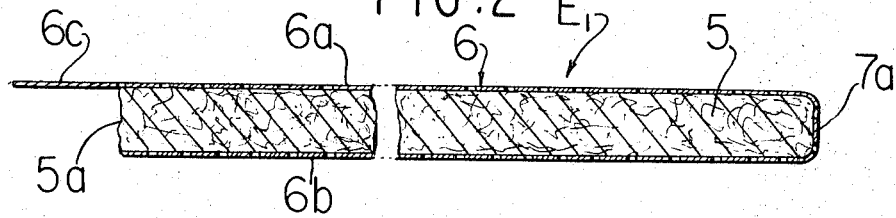
FIG. 2 illustrates in cross-section and also on an exaggerated scale, an electrode also embodying the invention prepared in accord with a further embodiment of the method of its preparation.

Alternatively, as shown in FIG. 2, the electrode $E_1$ comprising the felted carrier 5 impregnated with the active material as described may be located between two facing surfaces of a folded perforated metal sheet. It can be seen from FIG. 2 that the sheet 5 of nylon carrier felt having active electrode material incorporated therein is located between the facing surfaces 6a and 6b of a flexible perforated metallic sheet 6 similar to sheet 1, which is folded at 7a around the felted carrier sheet 5. The projecting end 6c of the metal sheet which extends beyond an end 5a of the felt 5 may again serve as connecting lug for the electrode $E_1$.

Figure 3:
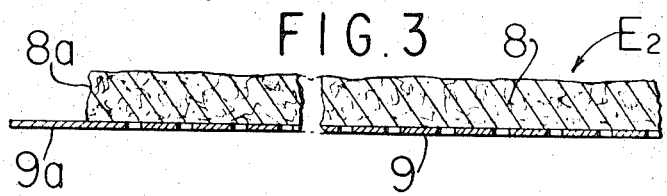
FIG. 3 illustrates in cross-section also on an exaggerated scale another electrode embodying the invention.

In a still further embodiment, as shown in FIG. 3, the electrode $E_2$ instead of being covered on both sides by a metal sheet, the plastic felted carrier 8 bearing incorporated active material as described, may be pressed against one face of a perforated metal sheet 9, whose end 9a protrudes beyond an edge 8a of the felted carrier sheet 8 again to serve as a current collector. Metallic current collector sheets 1, 6 or 9, while preferably perforated need not have perforations or may have only a relatively few perforations.

These collector sheets may also be roughened at least on their surfaces which engage the felted sheets 3, 5 or 8 by any treatment such as a mechanical roughing treatment, as a result of which small prominent burrs or particles extend from their roughened surfaces which will penetrate into the nylon carrier felt of sheets 3, 5 or 8, thus improving the electrical contact with the active materials of the latter. The thin metallic collector sheets may also be replaced by any equivalent material such as thin metallic wire-gauze, metallic grid or screens or thin expanded metal, or the like.

In assembling a storage cell or battery comprising electrodes embodying the invention, a positive and a negative electrode of the structure as shown in FIGS. 1, 2 or 3, for example, may be placed respectively on both sides of an insulating bibulous separator of plastic felt or the like, to form an electrode-separator block or pack. Then, the block or pack comprised of the electrodes and the separator is introduced, for example, into a flexible bag or container that may be made of polyethylene sheets that are welded or otherwise joined together. Prior to introduction of the block or pack into the bag, it may be dipped in appropriate alkaline electrolyte such as potassium hydroxide to the limit of absorption of electrolyte by the pack. Advantageously, the whole resulting assembly may be kept in a compressed state by any suitable means.

Obviously, if the metal collector sheet, such as that shown in FIG. 1, is not perforated, the electrode utilizing such an unperforated collector must not be placed at the outer end of the block or pack of the cell assembly. Instead, the block or pack then preferably is completed with an electrode of a different type such as that shown in FIG. 2, for example, before insertion into the flexible bag or container. Prior to sealing of the container or bag, electrolyte in required amount is provided for the electrode separator block.

Such cells containing 7 N KOH solution as electrolyte, have shown a voltage of about 1.2 volts at half-discharge at the two-hour rate. Determination of the power-to-weight ratio of the positive electrode has shown a yield of approximately 40%, which is not far from that of conventional tubular electrodes.

This type of storage cell is particularly suitable for supplying a constant polarization voltage since the current consumption is low.

Example II

The description regarding this example as presented below relates specifically, but not exclusively to medium or relatively high rate storage, batteries or cells.

Figure 4:
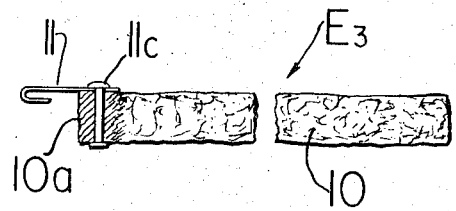
FIG. 4 illustrates in cross-section also on an exaggerated scale still another electrode embodying the invention.
Figure 5:
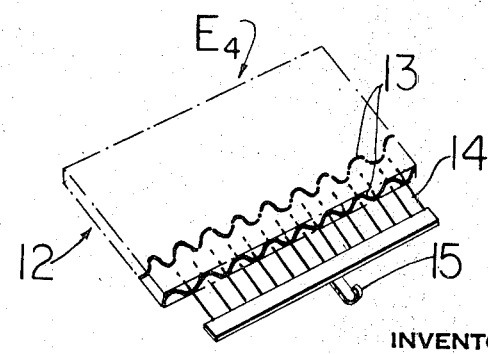
FIG. 5 illustrates in perspective also on an exaggerated scale yet a further electrode embodying the invention.

Referring to FIG. 4, the electrode $E_1$ comprises a fibrous flexible porous carrier 10 impregnated with active material.

Before being impregnated with the active material, non-conductive plastic fibres of the carrier (such as polyamid) are metal plated so that they become electrically conductive, and, therefore, there is no longer any need or very little need, to use metallic collector sheets or grids to conduct and distribute the current from such electrodes.

This plating of the fibres can be carried out by direct deposition of a metal such as nickel, copper, silver, etc., onto the fibres of the carrier 10, thus giving a metal coating which is adherent, flexible, and has a granular structure. Such plated fibres remain extremely flexible and they provide a large surface area for the subsequent deposition of active material thereon and in voids between fibres.

A preferred method for this embodiment comprises reducing an aqueous solution of a salt of the metal to be plated, after dipping of the carrier into such a solution. Considering, for instance, nickel plating, preliminary operations of washing and activating by hydrochloric solutions of stannous chloride and palladium chloride, should be followed by the dipping of the plastic felted or woven fabric 10 into a solution containing nickel chloride, which is afterwards reduced by sodium hypophosphite at a pH of about 5, in the presence of sodium citrate. The ratio of the weight of plated metal to the weight of the fibrous plastic material may be chosen at about 0.7.

For copper plating, the fibrous felted or woven fabric carrier is first dipped into a Fehling's solution (34.7 g. $CuSO_4 5H_2O$, 175 g. Rochelle salts, 50 g. sodium hydroxide in 1000 ml. water) which is afterwards reduced in situ in the dipped carrier as by formaldehyde to plate copper on the fibres.

For silver plating the fibrous felted or woven fabric carrier is dipped into a silver nitrate solution which is afterwards reduced as by hydrazine to plate silver on the fibres.

Whatever plating metal may be chosen, a conductive granular-structure metallic coating of the fibres is thus obtained which, first of all, leaves the major portion of the voids between the fibres clear for the deposition over and into voids between the so-treated (metallic plated) fibres of an adequate amount of active material so that the resulting electrodes may have the required capacity imparted thereto and, secondly, does not materially impair most of the original flexibility of the plastic fibrous fabric.

Since this metal plating applied to the fibres has a granular structure, active material has a better adherence to it, and can, therefore, be better and more uniformly distributed into the plated fibrous carrier. Thus, the resulting closer contact between the active material and the plated metal improves the electrochemical efficiency of the resulting electrode.

In the case described as an example of formation of an alkaline storage cell, a nickel plated felted sheet is cut into plates of the required surface area, then impregnated with a nitrate solution (nickel nitrate possibly mixed with cobalt nitrate for the positive electrode, cadmium nitrate for the negative electrode) then dried and dipped into a hot alkaline solution (sodium or potassium hydroxide) which precipitates the corresponding active material hydroxide onto the metal coating the fibres of the particular sheet and into voids between the fibres.

The operational sequence "impregnation-drying-precipitation" on the metal plated carrier sheets may be repeated several times in order to deposit or incorporate the desired amount of active material hydroxide. The deposited active material also has a good adherence to the metal coating of the synthetic fibres, so that the resulting electrodes are stable and strong.

The original untreated carrier sheet made of polyamid or similar fibres is extremely flexible and tends to bow under its own weight. Should such a great flexibility be maintained all along during the plating impregnation-drying-precipitation operations, the handling of the electrode carriers would be inconvenient. Fortunately, each operational step such as plating, impregnating-drying and precipitating, slightly reduces flexibility so that eventually and principally before the final drying, the so-treated carrier can be very readily folded on itself, rolled up, unfolded, and/or unrolled, but nevertheless retains a relative rigidity so that it will keep any imposed shape.

The current terminals for electrodes $E_3$ of this example can be, for instance, metal hooks 11, mechanically fixed, clamped or riveted at 11c on metallized carrier portions 10a which have been kept from impregnation and which hooks constitute connector lugs; or in a simpler way by metallic leads directly connected to the said lugs 11. The collector arrangements described with reference to Example 1 and shown in FIGS. 1–3 (metal sheets or similar) can also be used.

Performance tests have been carried out on an alkaline storage cell comprising a positive electrode made by nickel plating the fibres of a "nylon" felt and impregnating it with nickel hydroxide in four consecutive cycles of impregnation-drying-precipitating operations, and a negative electrode similarly made, but impregnated instead with cadmium hydroxide. Both electrodes were insulated from each other by a polyamid bibulous felted separator, and the block was firmly pressed, then impregnated with 7 N potassium hydroxide solution as electrolyte. Data from a cycling test of 132 charge and discharge cycles gave approximately 45% for the power-to-weight efficiency of the positive electrode at a 2-hour discharge rate.

Example III

In another embodiment the flexible electrode carrier 12 of electrode $E_4$ can be made of a woven fabric or a felt having plastic fibres 13 mingled with thin and flexible metal wires 14, made, for example, of silver or nickel, for instance, intended for conducting the current generated by electrochemical reactions without taking any part in them. In the case of a woven fabric, the metal wires 14 may constitute either the warp, or the weft or be a part of the one or of the other or of both. Quantitative distribution of metallic wire and plastic fibres must be suitable to impart a good efficiency to the active material (since it efficiently operates only when it is in thin layers). In addition, such mixed plastic-metallic-wire carriers 12 show advantageous characteristics of improved porosity, flexibility or strength, while ensuring the current conduction without any special treatment.

The impregnation of such a mixed carrier with active material can be achieved by processes similar to that described in the Examples I and II hereabove.

The current collectors may be constituted either by wire hooks 15 or by metal wire extensions (not shown).

As mentioned hereabove, the flexibility of the electrodes resulting from practice of the invention provide the means for constructing deformable cells with deformable containers. Alternatively, such electrodes may be given any particular shape inside a rigid or deformable container.

Figure 6:
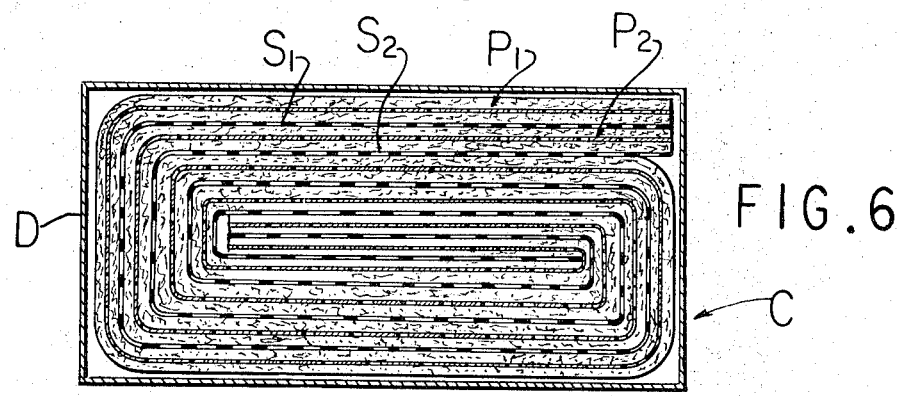
FIG. 6 illustrates in cross-section a cell or battery utilizing electrodes prepared in accord with the invention.

Thus, FIG. 6 shows a cross-section of a cell C wherein a pair of flexible opposite polarity electrodes $P_1$, $P_2$, at least one of which is made according to the practice of this invention and insulated from each other by a bibulous separator $S_1$ are folded several times upon themselves so as to fill a flexible parallelepipedic container D of flexible material, or rigid material, another insulating and porous separator $S_2$ being, of course, introduced between opposite polarity adjoining faces of the electrodes $P_1$ and $P_2$ in the folded assembly. The electrodes $P_1$ and $P_2$ may also be spirally wound together with separators $S_1$ and $S_2$ so as to fill a cylindrical container, rather than one having the shape of container D, the central radius of the spiral winding in such case being very small in order to save space, this type being of a great interest particularly for cells of small diameters.

According to another feature of the invention, related to the flexibility of the carrier used in the electrode, the said carrier made according to any of the examples may, after the deposition of active material thereon as described herein be compressed to reduce its thickness. The advantage of such compression lies in the reduction of the number of "impregnation-drying and precipitation" cycles, generally necessary to obtain a required active material capacity in a given initial carrier volume. Only one cycle may even be sufficient in such case, followed by a washing and a drying. As a matter of fact, since the compression is effected after the incorporation of the active material as described, the result is the same as if the amount of the incorporated active material per unit of carrier volume had been considerably increased in the completed electrode as reduced by compression to its final thickness, though the remaining porosity is still sufficient, if care has been taken to start with a highly porous fibrous felted or fabric carrier. It will be recalled that the porosity is the ratio of the volume of the carrier voids to the total volume.

For example, using a carrier of nylon fibre felt or a mixed felt made of nylon fibres and metal fibres having an initial porosity of about 90% before the incorporation therein of active material, the compression carried out after the incorporation may be to the extent of reducing it to 50% of initial carrier thickness. Then, the volume of the voids will be reduced by more than 50%, so that the maximum amount of active material which can be introduced in one cycle before compression exceeds twice the amount that could have been introduced in the fabric or felted carrier after compression.

More particularly, in assembling a storage cell, an electrode according to the invention can be associated to any other type of electrode, the shape of which will closely engage its shape due to its flexibility.

All the embodiments described herein are related embodiments of the invention, and are presented only as examples which can be modified, especially by variations of equivalent techniques without departing from the scope of the invention as claimed. There is no intention of limitation, therefore, to the exact disclosure herein presented.

What is claimed is:

1. An electric storage cell comprising in assembly a casing, a flexible positive electrode, a flexible negative electrode, a flexible separator between electrodes of opposite polarity and electrolyte within the casing, said electrodes each comprising a porous flexible fibrous carrier, some at least of the fibres of each such carrier being of non-conductive synthetic material which is insensitive to thermal, chemical and electro-chemical conditions prevailing in the cell, the respective porous fibrous carriers of the positive and negative electrodes bearing precipitates of respective positive and negative active materials introduced into their voids, said porous carriers prior to assembly in said cell and after introduction of the precipitates into their voids being in substantial compressed reduced state of thickness relative to their initial thicknesses.

2. An electric storage cell comprising in assembly a casing, a flexible positive electrode, a flexible negative electrode, a flexible separator between electrodes of opposite polarity within the casing, at least one of said electrodes comprising a flexible porous fibrous carrier, some fibres of each such carrier being of non-conductive synthetic material which is insensitive to thermal, chemical and elecrochemical conditions prevailing in the cell, each porous fibrous carrier bearing a precipitate of required electrode active material introduced into its voids, all electrodes and separator being compressed together to provide intimate contact therebetween and that one of said electrodes comprising the flexible porous carrier prior to assembly in said cell and after introduction of precipitate into its voids being also in substantial compressed reduced state of thickness realtive to its initial uncompressed thickness.

3. An electric storage cell comprising in assembly a casing, a flexible positive electrode, a flexible negative electrode, a flexible separator between electrodes of opposite polarity and electrolyte within the casing, said electrodes each comprising a porous flexible fibrous carrier, some at least of the fibres of each such carrier being of non-conductive synthetic material which is insensitive to thermal, chemical and electro-chemical conditions prevailing in the cell, the respective porous fibrous carriers of the positive and negative electrodes bearing precipitates of respective positive and negative active materials in major part introduced into their voids, each said porous carriers prior to assembly in said cell being in compressed reduced state of thickness which is up to approximately 50% of its initial thickness whereby the volume of its voids bearing the precipitate also are reduced substantially relative to their initial volume, thus increasing the relative capacity of the precipitate therein with respect to final electrode volume.

4. An electric storage cell comprising in assembly a casing, a flexible positive electrode, a flexible negative electrode, a flexible separator between electrodes of opposite polarity within the casing, at least one of said electrodes comprising a flexible porous fibrous carrier, some fibers of each such carrier being of non-conductive synthetic material which is insensitive to thermal, chemical and electro-chemical conditions prevailing in the cell, each porous fibrous carrier bearing a precipitate of required electrode active material introduced into its voids, all electrodes and separator prior to assembly in said cell being in compressed state to provide intimate contact therebetween, and each porous carrier also prior to assembly in said cell and after introduction of precipitate into its voids being in compressed reduced state of thickness which is up to approximately 50% of its initial uncompressed thickness with its voids also of substantially reduced volume.

5. An electric storage cell according to claim 3 in which said casing also is of flexible material so that the cell may be shaped as desired.

6. An electric storage cell according to claim 3 wherein each electrode includes a thin metallic current collector in intimate contact with portions of the active material of such electrode.

7. An electric storage cell according to claim 4 wherein the casing has desired shape and the electrodes and separator are deformed and compressed therein to substantially fill the interior of the casing and provide a cell has desired shape.

8. An electric storage cell according to claim 4 wherein the cell has parallelepiped configuration whose interior is substantially completely filled by the compressed deformed electrodes and separator.

9. An electric storage cell according to claim 4 wherein the cell has cylindrical configuration whose interior is substantially completely filled by the compressed deformed electrodes and separator.

10. An electric storage cell comprising in assembly a casing, a flexible positive electrode, a flexible negative electrode, a flexible separator between electrodes of opposite polarity, said electrodes each comprising a porous flexible fibrous carrier some at least of whose fibres in each carrier being of non-conductive synthetic material which is insensitive to thermal, chemical and electrochemical conditions prevailing in the cell, the respective porous fibrous carriers of the positive and negative electrodes bearing precipitates of respective positive and negative active materials introduced into their voids, each said porous carrier with the precipitates therein prior to assembly in said cell being in substantial compressed reduced state of thickness relative to its initial thicknesses, said compressed reduced state ranging up to approximately 50% of its initial thickness, thereby providing high density of active material in its voids and reducing to a minimum the number of cycles required to introduce precipitate into its voids.

References Cited

UNITED STATES PATENTS

| | | | |
|---|---|---|---|
| 1,377,194 | 5/1921 | Edison | 136—28 |
| 2,626,294 | 1/1953 | Brennan | 136—28 |
| 2,794,845 | 6/1957 | Grabe | 136—59 XR |

WINSTON A. DOUGLAS, Primary Examiner

A. SKAPARS, Assistant Examiner

U.S. Cl. X.R.

136—69, 73